(12) United States Patent
Parvathaneni

(10) Patent No.: US 10,630,683 B2
(45) Date of Patent: *Apr. 21, 2020

(54) ENCRYPTION KEY UPDATES IN WIRELESS COMMUNICATION SYSTEMS

(71) Applicant: Imagination Technologies Limited, Kings Langley (GB)

(72) Inventor: Chakra Parvathaneni, Cupertino, CA (US)

(73) Assignee: Imagination Technologies Limited, Kings Langley (GB)

(*) Notice: Subject to any disclaimer, the term of this patent is extended or adjusted under 35 U.S.C. 154(b) by 347 days.

This patent is subject to a terminal disclaimer.

(21) Appl. No.: 15/368,001

(22) Filed: Dec. 2, 2016

(65) Prior Publication Data

US 2017/0078290 A1 Mar. 16, 2017

Related U.S. Application Data

(63) Continuation of application No. 14/336,976, filed on Jul. 21, 2014, now Pat. No. 9,544,767.

(51) Int. Cl.
*H04L 9/32* (2006.01)
*H04L 29/06* (2006.01)
*H04L 9/08* (2006.01)
*H04W 12/00* (2009.01)
*H04W 12/04* (2009.01)
(Continued)

(52) U.S. Cl.
CPC ........ *H04L 63/0876* (2013.01); *H04L 9/0891* (2013.01); *H04L 9/3242* (2013.01); *H04W 12/0013* (2019.01); *H04W 12/04* (2013.01); *H04L 63/0428* (2013.01); *H04L 63/061* (2013.01); *H04L 63/162* (2013.01);
(Continued)

(58) Field of Classification Search
USPC .............. 713/171, 150, 151, 153, 160, 189
See application file for complete search history.

(56) References Cited

U.S. PATENT DOCUMENTS

2003/0221098 A1   11/2003  Chen et al.
2005/0071629 A1*   3/2005  Biederman ............... H04K 1/00
                                                     713/151
2010/0091993 A1*   4/2010  Iwama ................... H04W 12/04
                                                     380/273

FOREIGN PATENT DOCUMENTS

EP         2574103 A     3/2013

* cited by examiner

*Primary Examiner* — Wasika Nipa
*Assistant Examiner* — Samuel Ambaye
(74) *Attorney, Agent, or Firm* — Potomac Law Group, PLLC; Vincent M. DeLuca

(57) ABSTRACT

In an aspect, a wireless communication between a transmitter and a receiver involves determining updated keys according to a key management process for MAC layer encryption. Such key is propagated to a transmitter MAC and though a receiver key management process to a receiver MAC. After a delay, transmitter MAC device begins using the updated key, instead of a prior key, for payload encryption. Receiver MAC continues to use the prior key until a packet that was accurately received fails a message integrity/authentication check. Then, the receiver MAC swaps in the updated key and continues to process received packets. The packet data that failed the message integrity check is discarded. Transmitter MAC retries the failed packet at a later time, and if the packet was accurately received and was encrypted by the transmitter MAC using the updated key, then the receiver will determine that the message is authentic and will receive it and acknowledge it.

8 Claims, 4 Drawing Sheets

(51) Int. Cl.
*H04W 84/12* (2009.01)
*H04W 92/10* (2009.01)
(52) U.S. Cl.
CPC ......... *H04L 2209/80* (2013.01); *H04W 84/12* (2013.01); *H04W 92/10* (2013.01)

ENCRYPTION KEY UPDATES IN WIRELESS COMMUNICATION SYSTEMS

BACKGROUND

Field

In one aspect, the disclosure generally relates to communication systems and in one more particular aspect, encryption processes used in wireless communication systems.

Description of Related Art

A communication system may use encryption to make eavesdropping on data traffic between stations more difficult. One approach to encryption is to use a pre-shared key. For example, a key is provided at both a base station and an end point node. A pre-shared key provides some amount of security. A stronger form of security is to initially connect using a pre-shared key, but then to renegotiate keys during an ongoing active connection. As keys are renegotiated, they need to be shared between the communicating stations (in a point to point communication situation).

SUMMARY

In one aspect, a process of receiving encrypted communications in a network comprises maintaining, in a hardware decryption engine of a Media Access Control (MAC) layer, at a receiving device, a current cipher key, for use in decrypting packets of data received from a transmitting device, in an established communication session. The process also comprises receiving, from the transmitting device, a new cipher key to replace the current cipher key and updating, at the receiving device, the current cipher key with the new cipher key responsive to determining that (1) a packet was received without detectable error but that (2) data contained in a decrypted payload from the packet cannot be authenticated using the current cipher key. The process also provides, after updating the current cipher key, waiting for a retransmission of the packet, decrypting and authenticating the payload of the packet using the updated current cipher key. Only after passing authentication using the updated current cipher key, the process acknowledges receipt of the packet and discards the previous current cipher key. Other aspects include component circuitry for implementing the example process. Other aspects include apparatuses that implement the example process. Other aspects include non-transitory machine readable media that embody data interpretable as circuits or machinery that perform implementations of the example process during operation.

BRIEF DESCRIPTION OF THE DRAWINGS

For a fuller understanding of aspects and examples disclosed herein, reference is made to the accompanying drawings in the following description.

DETAILED DESCRIPTION

Figure 1:
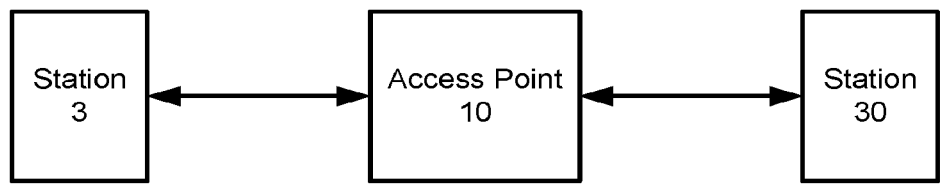
FIG. 1 depicts a system context in which implementations of the disclosure may exist.

In an example networking system, encryption may take place at a link layer (L2). The majority of the operations required to encrypt the data being sent may be performed within a Media Access Control (MAC) element (a "MAC"), which may have hardware-specific acceleration features for handling such operations. In some examples, a portion or an entirety of MAC functionality can be implemented with hardware acceleration, such as by using fixed-function hardware elements. MAC functionality may be integrated into a System On Chip (SOC), may be integrated with physical layer (PHY) layer circuitry, or both.

Data frame size in wireless networking implementations vary. For example, a baseline 802.11 (commonly known as Wireless Fidelity (WiFi)) packet allows up to 2.3 Kilobytes of data. However, in 802.11n Aggregated Mac Service Data Unit (A-MSDU) increases the maximum frame transmission size from 2,304 bytes to almost 8 k (7935 Bytes) and the Aggregated Mac Protocol Data Unit (AMPDU). A-MPDU allows up to 64 k bytes.

Also, hardware resources to support sending and receiving WiFi packets need to be considered, in that implementation cost is directly related to an amount of chip area devoted to these hardware resources, and chip area increases as more hardware resources are provided. For example, memory for buffering packets being received is generally required. Providing an implementation that uses more packet buffer memory would be costlier, all else being equal.

A wireless networking solution (such as a combination of MAC and PHY), provides a data communication service that may ultimately be used by application-layer software. Several intermediate layers typically exist between the application layer software and the MAC/PHY, such as a transport or session layer and a network addressing/router layer (e.g., TCP and IP protocols, respectively).

With particular regard to encryption, IEEE 802.11 series communication devices ("WiFi") use a symmetric key cipher. Initially, WiFi used Wired Equivalent Privacy (WEP), which is an RC4 cipher that provided a key scheduling algorithm and an output generator. In WEP, the key scheduling algorithm has two options, a 64-bit key (40-bit secret key plus 24-bit initialization vector) or a 128-bit key (104-bit secret key plus 24-bit initialization vector). The original WEP approach was vulnerable to a variety of attacks, with one example attack being a plain text attack that used a known plain text message and its encrypted form to obtain the key used to cipher a given packet. Typically, the initialization vector can be obtained from unencrypted transmitted information, so from the collection of information, the secret key could be obtained.

One approach to increasing the strength of WiFi security is to provide for regular changes to the secret key (and/or to some cipher input, which is not public). If the secret key regularly changes, then even if a given key is comprised using an attack, then the amount of information that is obtained from that attack can be limited. Also, if keys are rotated frequently enough, then a time required to compute the key may be less than a time that such key is active. The applicability of the disclosures herein are not confined to IEEE 802.11 series communication devices ("WiFi"), and rather, these disclosures may be implemented in a variety of network communication systems that provide key changes during an ongoing communication session.

A Media Access Control (MAC) layer payload in WiFi is encapsulated in a packet having data arranged according to a physical layer packet format. The MAC layer payload is encrypted or ciphered using a stream cipher that mixes data from the payload with a pseudorandom sequence derived based on a secret key that is shared between both an encrypting device and a decrypting device.

The secret key used in such a cipher can be determined according to a process or a key exchange protocol. Typically, determining a key exchange protocol or process and following that protocol or process are tasks for processes or software that are higher up in the network stack than the modules performing the MAC (Link) Layer encryption/decryption being addressed here. Therefore, there is a comparatively significant amount of time to propagate a key change, and that time may be variable. For example, a key management process executing in software may decide to change the key being used to encrypt outgoing packets, but when a lower level encryptor actually first begins to use the new key to encrypt outgoing packets is unknown. In general, it takes on the order of milliseconds to propagate a new key from higher layer software. However, packet communication requires on the order of microseconds. Similarly, even though the receiver would generally be following the same key exchange protocol or process, there is a zone of uncertainty within which it is unknown which key each packet is encrypted with. Eventually, there will be a cutover from one key to another, such that there will be one packet encrypted with the old key and the next packet encrypted with the new key.

One approach to changing keys is simply to change over the key being used in the sender when the new key is available at the sending, and to change over at the receiver, when the receiver has the new key. This approach would result in packet loss for the set of packets that were encrypted with the old key but which are attempted to be decrypted by the new key. Such packet loss would undesirable, such as in voice communication situations. Another approach is to wait a finite amount of time before changing keys on both the TX and Rx sizes. However, this is not a guarantee of a switch over without loss. Also, some applications may have service requirements or profiles that would make this delay undesirable. For example, some applications would not want to incur such delay and would instead rather communicate using the old key during that period of time.

Another approach is to provide a receiver that decrypts each packet using both the old and new key. However, this approach may require duplicating hardware supporting such decryption, because wireless packet networks require adherence to protocols that specify timings for events to occur. Such duplication would increase the cost of the solution. Alternatively, the cryptography engines could be made to run faster such that one cryptography engine could process both packets. However, such an approach would require more buffer space to store the packet while it is decrypted twice, and also such cryptography engine would need to be more powerful. Hence, there also would be an area penalty. Other penalties would include extra power consumption.

FIG. 1 depicts an overview of a context in which aspects of the disclosure may be implemented. FIG. 1 depicts a station 3 communicating with an access point 10 that also communicates with a station 30. In general, each of station 3 and station 30 would negotiate a MAC layer encryption key with access point 10. Stations 3 and 30 may also be employing encryption at other layers of the communication stack, for such purposes as implementing a Virtual Private Network. Also, in the context of FIG. 1, each of stations 3 and 30 and access point 10 may be performing full duplex communication, such that each of these devices may act both as a receiver and as a transmitter according to the disclosure. Although FIG. 1 depicts that the stations 3 and 30 communicate with access point 10 directly, aspects of the disclosure may be implemented where at least one of stations 3 and 30 communicate over an intermediate network (e.g., a network or internet may connect either station 3 or station 30 to AP 10; AP 10 also may couple with another network or an internet). Other equipment also may be involved in communications between each of stations 3 and 30 and access point 10, such as wireless repeaters. Other contexts in which disclosed aspects may be employed include ad hoc communication between two or more devices.

Figure 2:
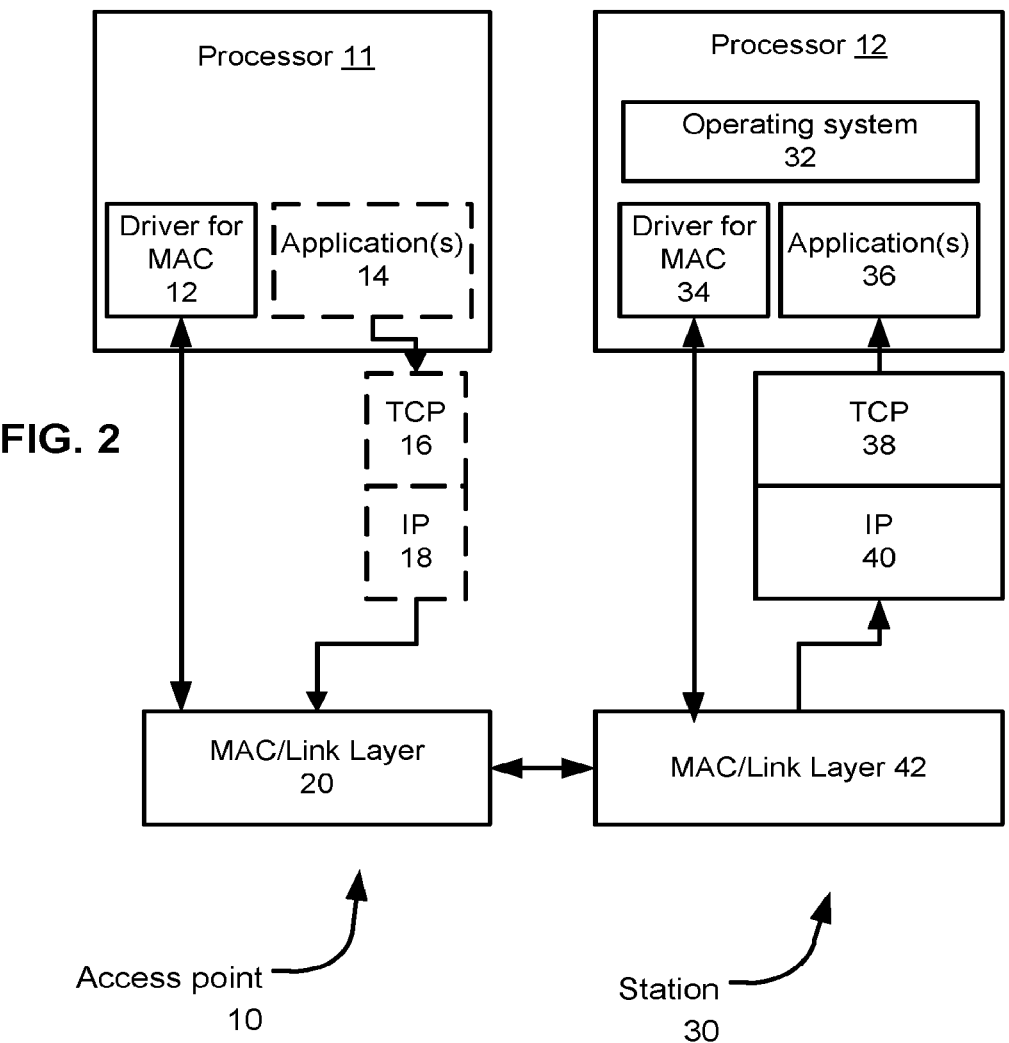
FIG. 2 depicts further details concerning example devices that may implement aspects of the disclosure.

FIG. 2 depicts a more specific example, in which access point 10 contains a processor 11, in which may execute a driver 12 for a MAC device layer 20. Processor 11 also may execute one or more applications 14. These applications may use a TCP/IP stack (numbered 16 and 18). For example, access point 10 may implement a network attached storage service that uses TCP/IP, a stateful packet inspection application may be implemented, and so on. Where access point 10 serves to connect a device (e.g., station 30) to another network, access point 10 may simply be encrypting/decrypting a link layer payload for packets being sent/received to/from that device, and higher level network layers or applications may not be involved in such processes. FIG. 2 depicts an example arrangement to implement station 30, in which a processor 12 may host an operating system 32, a driver 34 for a MAC device layer 42, and one or more applications 36. In many cases, a TCP/IP stack 38/40 may be provided.

Figure 3:
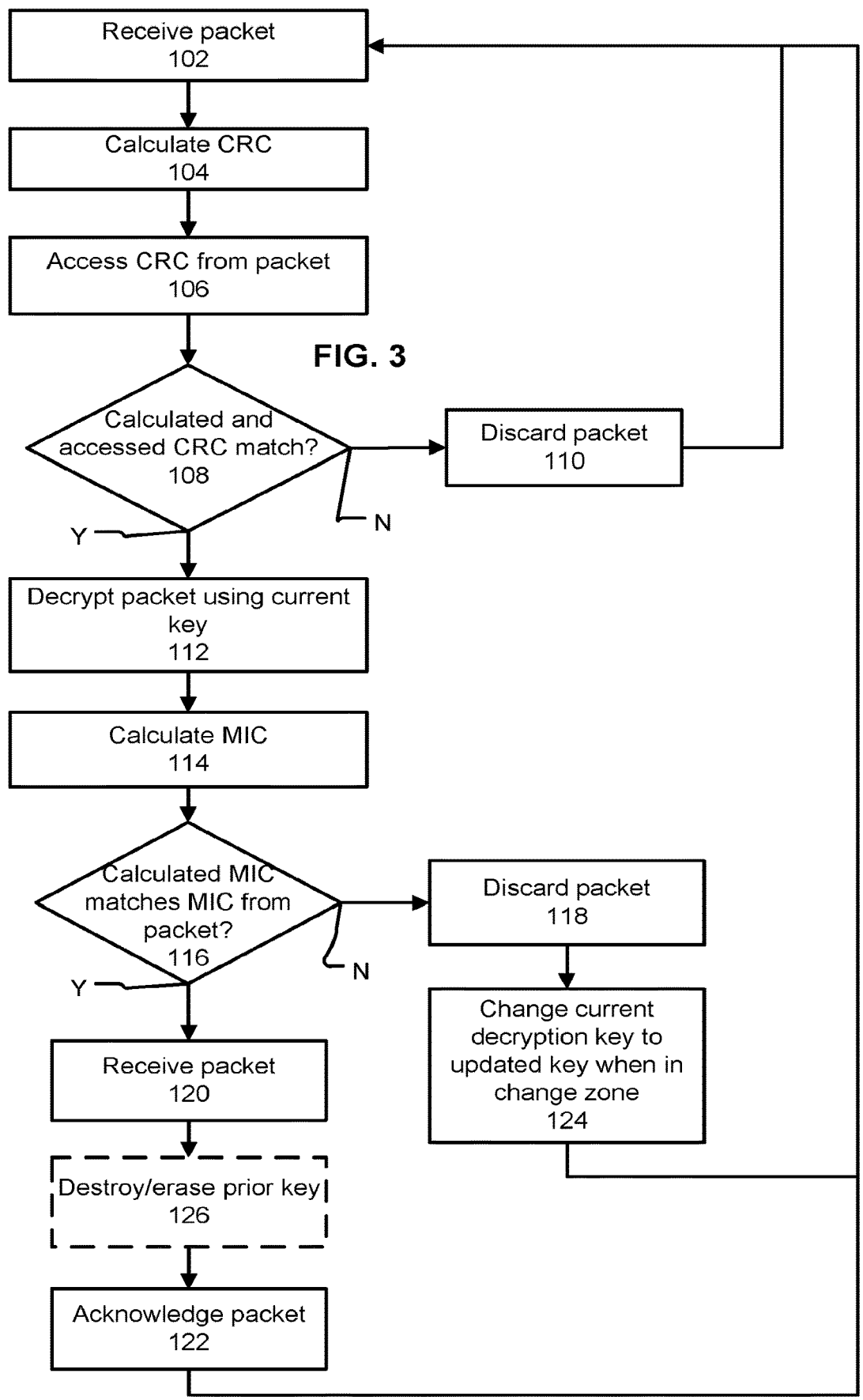
FIG. 3 depicts an example process according to the disclosure.

FIG. 3 depicts an example process that can be implemented in a device configured for receiving packets with MAC payloads encrypted according to the disclosure. At 102, a packet is received, and at 104, a Cyclic Redundancy Check (CRC) is calculated for the received packet. A CRC is an example, and a particular implementation of the disclosure may provide any of a variety of ways to detect whether a packet has been accurately received, or if there were one or more bit errors. Each of these types of validity checks may have limitations on the kind and/or quantity of errors that can be detected, and different communication standards may employ a selected type of check according to specific characteristics of the communication channel being used, or other considerations. Some processes according to the disclosure may dispense with such a validity check, although most implementations would be expected to employ some variety thereof. As such, CRC is simply an example and is not limiting.

At 106, a CRC is obtained from the packet and compared, at 108, with the calculated CRC. If these two CRC values do not match, then the packet is discarded at 110. Otherwise, the packet payload is decrypted using a current decryption key at 112. A Message Integrity Code (MIC) is calculated, at 114, using the decrypted payload. At 116, a determination is made whether the calculated MIC matches a MIC retrieved from the payload. If the calculated and retrieved MICs do correspond, then the packet is received at 120 and acknowledged at 122. If the calculated and retrieved MICs do not correspond, then the packet is discarded at 118. Then, at 124, the current decryption key is swapped with an updated key that was negotiated between the driver 12 and driver 34 (in the example of FIG. 2). At this point, the process simply waits for reception of another packet at 102. In one implementation, the encrypted payload is not retained in memory, to avoid needing to provide memory space for such purpose. FIG. 3 exemplifies a process that may be implemented in a communication protocol that requires positive acknowledgement of each packet (either alone or as a grouped acknowledgement), and since no positive acknowledgement was sent in the process of FIG. 3, the sending device (e.g., access point 10) will attempt to transmit the packet to the receiver (e.g., station 30) again. Exactly when the packet may be retried may vary depending on the protocol, depending on circumstances, or both. As such, the next packet received may or may not be a retry of the prior packet, but the same approach to receiving the packet may be employed.

Thus, the next packet received is processed according to the actions at 102-108, and if passing CRC, the actions at 112-116, except that now, the decryption at 110 and the MIC calculation at 114 uses the updated key. If the MICs match this time, then the packet is received 120, and the prior key that had been tried previously can be destroyed or allowed to be erased at 126. At 122, the packet can be acknowledged. As such, in the process according to FIG. 3, the acknowledgement of a packet is conditioned on passage of the described MIC comparison, while otherwise, such acknowledgement would be conditioned only on passage of the CRC. The process of FIG. 3 thus provides an approach to changing encryption keys in a communication model wherein the communicating devices are loosely synchronized or unsynchronized. This approach can rely on a retry mechanism built into an underlying communication protocol, and does not require changing such a protocol in order to accommodate these additional considerations.

Figure 4:
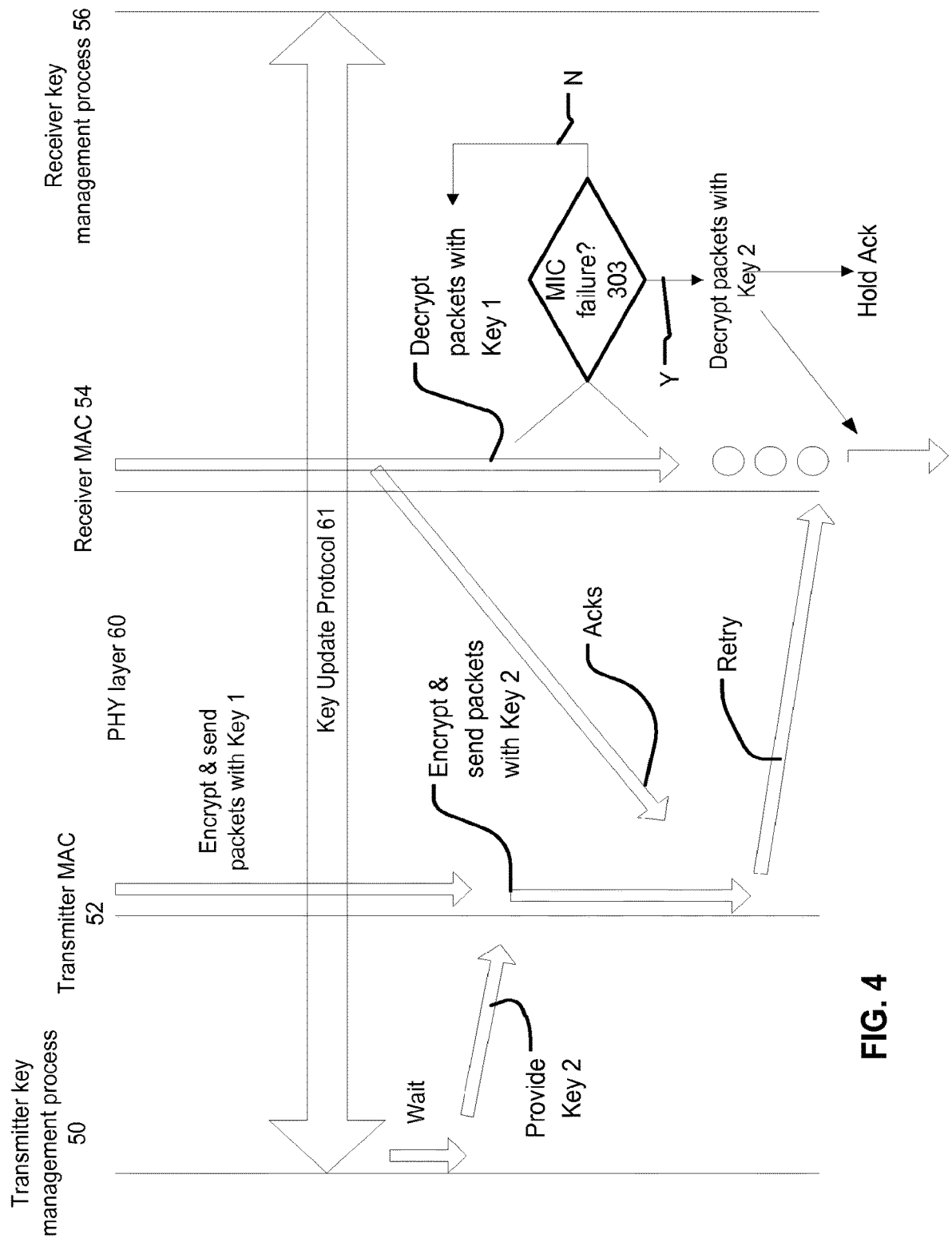
FIG. 4 depicts an example data flow diagram according to the disclosure.

FIG. 4 depicts a diagrammatic view of interactions among devices that may implement the process of FIG. 3. FIG. 4 assumes an ongoing communication session, in which a first key (key 1) has been negotiated. Such negotiation occurs between a transmitter key management process 50 and a receiver key management process 56. These processes can be implemented in software on a processor, and may be provided with a driver for a MAC device at each of transmitter and receiver. A transmitter MAC 52 encrypts and sends one or more packets with Key 1. A number of such packets transmitted may depend on how much data is to be transmitted, and on specifics of a key management process being used. Such process of encryption and sending can be an ongoing process, such that as data is available to be sent, it can be sent according to a media access protocol specified by a given communication standard, for example. Such packets are transmitted according to a PHYsical (PHY) layer 60 format. Receiver MAC 54 generates acknowledgements according to the process of FIG. 3 (requiring that a given packet pass an integrity check as well as decrypt to an appropriate result).

During the encryption, transmission, reception and decoding of packets using key 1, a key update protocol 61 is occurring between transmitter and receiver key management processes 50 and 56. This protocol 61 results in a key 2, which is provided from management process 50 to transmitter MAC 52, and is provided from process 50 to process 56, which propagates key 2 into receiver MAC 54. The keys may be sent from process 50 to process 56 using an encrypted packet. In some implementations, a special encryption key may be used in encrypting these packets. FIG. 4 depicts that Receiver MAC 54 continues to decrypt packets using key 1 and verifying (303), whether or not message authentication fails. Responsive to failure of message authentication, Receiver MAC 54 switches to using key 2, which was propagated from process 56, and was held awaiting message authentication failure. Until a given packet passes message authentication, acknowledgement of the packet is held. Transmitter MAC 52 will retry packets until receiving an acknowledgement.

Figure 5:
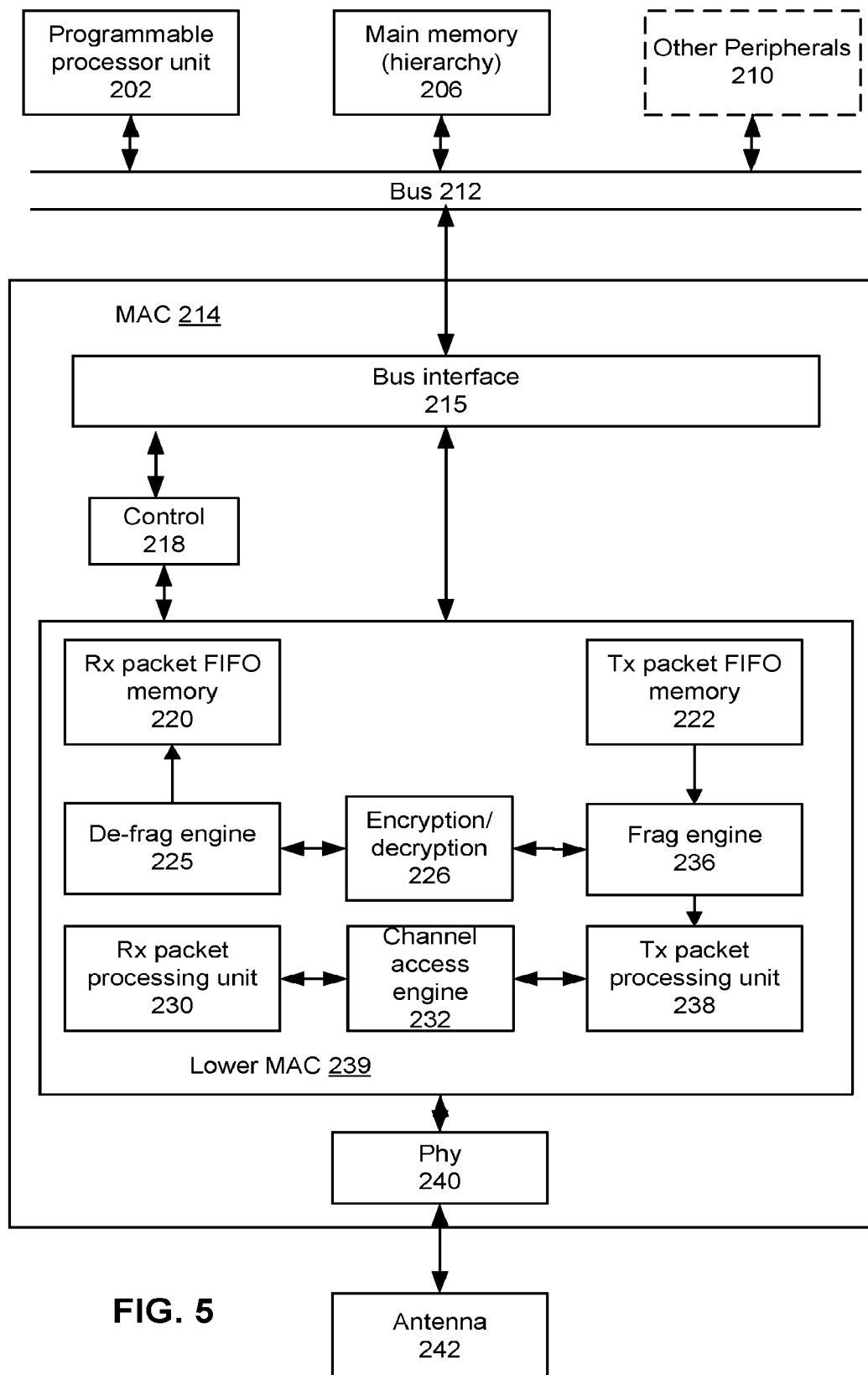
FIG. 5 depicts further an example block diagram of a device that may implement aspects of the disclosure.

FIG. 5 depicts further details of an example device in which aspects of the disclosure may be implemented. A programmable processor 202 couples with a bus 212, which also couples with a main memory 206, which can be implemented using a memory hierarchy. Other peripherals 210 also may connect to bus 212. A MAC 214 couples with bus 212 using a bus interface 215. A control element 218 couples with bus interface 215. Control element may implement configurable and MAC functions, such as Quality of Service. Bus interface 215 also includes a datapath that couples with a lower MAC 239, which handles real time packet processing, including the encryption and decryption functions described herein. Lower MAC 239 may include a receive FIFO memory 220, that couples with a defragmentation engine 225. An encryption/decryption engine 226 couples with defragmentation engine 225 and with a fragmentation engine 236 on a transmit side. Fragmentation engine 236 receives data from a transmit FIFO memory 222 and also couples with a transmit packet processing unit 238. Transmit packet processing unit 238 couples with a channel access engine 232, which also coupled with a receive packet processing unit 230. Channel access engine 232 manages how MAC 214 interfaces with a physical layer 240, which in turn couples with one or more antenna 242. The example block diagram of FIG. 5 is non-limiting and those of ordinary skill in the art would be able to produce implementations of the disclosure that have different configurations, based on the disclosure herein.

The above example can be applied in the context of aggregating multiple Protocol Data Units (PDUs). For example, in Aggregating MAC PDUs (AMPDU or A-MPDU), an acknowledgement is sent for a block of received frames, which is called a block acknowledgement. However, there is a CRC for each MPDU of an AMPDU transmission. Thus, as each MPDU arrives, the CRC for that PDU can be checked, and the method performed for that PDU. A block acknowledgement in AMPDU identifies each fragment to be acknowledged and includes a pass/fail bit, indicating whether that fragment of the AMPDU was received. Thus, the retry may be embodied by the bits that indicate receive/not received. At a worse case, an entire AMPDU can be retransmitted, where the PDUs are then attempted to be decrypted using the new key.

It was explained above that the retry mechanism is used to obtain another opportunity to attempt to decrypt a given packet using a new key (and that a failure to decrypt the packet using a prior key is evidence that the packet was encrypted with a different key than the one tried to decrypt). Rate adaptation algorithms use CRC errors as a basis for setting a data rate. Since the disclosed methods and systems employ one retry, the approach is expected to have negligible effect on rate adaptation algorithms, even in noisy environments. In noisy environments, transmission errors are more likely, and so a situation may occur in which a retry packet is received with errors and needs to be discarded. Under such a circumstance, the link would be able to function appropriately on a next packet.

When using fragmentation, a Message Integrity Code (MIC) is known after the transmission of the last fragment. Therefore, previously received fragments cannot be tested for failure of decryption using a given key. In such a circumstance, a separate ACK/retry message may be used as a signal to retry transmission of a fragmented packet.

Another option is to disable fragmentation when implementations of the disclosure are being used.

In the context of the disclosure, the term "key" is used to refer to an element of data that is generated or updated, and used to encrypt and/or decrypt one or more packets. Such a key may be a product of a process that involves using a static or quasi static shared secret key, and other inputs, such as initialization vectors, counter values, and so on. As such, a shared secret key may be used to produce the keys that are updated according to the disclosure. Various approaches may be implemented to update these keys. For example, a key update process for a personal mode in which a static (until changed) key is shared (a pre-shared key) between an access point and a device may differ from an enterprise mode that provides an authentication server in which a master key may be produced according to a process agreed upon between the devices. In implementations that use 802.11 WiFi Protected Access 2 (WPA2), the keys that are changed may be temporal keys, which may be generated using a pairwise master key, which is generated from a master key or a pre-shared key. Wireless networks may employ different approaches to key changing or rotation, and the specific examples herein are not limiting to how the disclosure may be incorporated into various implementations.

Similarly, the term "Message Integrity Code" (MIC) was used in the context of determining whether authentication of a given packet was successful. The term MIC is not used in a limiting sense, such as to imply that a separate process is provided for message integrity checking, but rather in the general sense to refer to a data element or a process by which data can be generated for use in a determination whether or not a given authentication process was successful or not. For example, some encryption approaches may use only a single key for both encryption and authentication, and some approaches may generate an authentication component as a byproduct of encryption. Some approaches may involve selecting a portion of an output from a process, such as an upper or lower 64 bits of a larger output vector. Some approaches may encrypt the MIC.

The terms transmitter, receiver, sender and so on were used to describe information flow in the examples presented. However, these terms are not implied limitations that a given device may only be able to transmit or receive, and a given device may be able to perform both as a transmitter and as a receiver, and may be able to do so simultaneously.

Aspects of functions, and methods described and/or claimed may be implemented in a special purpose or general-purpose computer including computer hardware, as discussed in greater detail below. Such hardware, firmware and software can also be embodied on a video card or other external or internal computer system peripherals. Various functionality can be provided in customized FPGAs or ASICs or other configurable processors, while some functionality can be provided in a management or host processor. Such processing functionality may be used in personal computers, desktop computers, laptop computers, message processors, hand-held devices, multi-processor systems, microprocessor-based or programmable consumer electronics, game consoles, network PCs, minicomputers, mainframe computers, mobile telephones, PDAs, tablets and the like.

Aspects disclosed herein will generally exist in the context of larger systems and components of systems. For example, processing can be distributed over networks, such as local or wide area networks and may otherwise be implemented using peer to peer technologies and the like. Division of tasks can be determined based on a desired performance of the product or system, a desired price point, or some combination thereof. In embodiments implementing any of the described units at least partially in software, computer-executable instructions representing unit functionality can be stored on computer-readable media, such as, for example, magnetic or optical disks, flash memory, USB devices, or in networks of storage devices such as NAS or SAN equipment, and the like. Other pertinent information, such as data for processing can also be stored on such media.

In addition to hardware embodiments (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, SystemC Register Transfer Level (RTL) and so on, or other available programs, databases, and/or circuit (i.e., schematic) capture tools. Embodiments can be disposed in computer usable medium including non-transitory memories such as memories using semiconductor, magnetic disk, optical disk, ferrous, resistive memory, and so on.

As specific examples, it is understood that implementations of disclosed apparatuses and methods may be implemented in a semiconductor intellectual property core, such as a microprocessor core, or a portion thereof, embodied in a Hardware Description Language (HDL)), that can be used to produce a specific integrated circuit implementation. A computer readable medium may embody or store such description language data, and thus constitute an article of manufacture. A non-transitory machine readable medium is an example of computer readable media. Examples of other embodiments include computer readable media storing Register Transfer Language (RTL) description that may be adapted for use in a specific architecture or microarchitecture implementation. Additionally, the apparatus and methods described herein may be embodied as a combination of hardware and software that configures or programs hardware.

Also, in some cases terminology has been used herein because it is considered to more reasonably convey salient points to a person of ordinary skill, but such terminology should not be considered to impliedly limit a range of implementations encompassed by disclosed examples and other aspects.

Also, a number of examples have been illustrated and described in the preceding disclosure, each illustrating different aspects that can be embodied systems, methods, and computer executable instructions stored on computer readable media according to the following claims. By necessity, not every example can illustrate every aspect, and the examples do not illustrate exclusive compositions of such aspects. Instead, aspects illustrated and described with respect to one figure or example can be used or combined with aspects illustrated and described with respect to other figures. As such, a person of ordinary skill would understand from these disclosures that the above disclosure is not limiting as to constituency of embodiments according to the claims, and rather the scope of the claims define the breadth and scope of inventive embodiments herein. The summary and abstract sections may set forth one or more but not all exemplary embodiments and aspects of the invention within the scope of the claims.

What is claimed is:

1. A process of receiving encrypted communications in a network, comprising:

receiving at a link layer of a receiving device a current key, for use in decrypting packets of data received from a transmitting device in a communication session;

receiving from the transmitting device a new key;

in response to determining that data contained in a payload from a received packet cannot be decrypted using the current key, updating, at the receiving device, the current key with the new key; and after updating the current key, waiting for a retransmission of the packet, decrypting the payload of the packet using the updated current key, and only after successfully decrypting the payload using the updated current key acknowledging receipt of the packet.

2. The process of receiving encrypted communications in a network as set forth in claim 1, further comprising negotiating the current key and, after a period of time elapses, negotiating the new key, using software executing on a respective processor at each of the transmitting device and the receiving device.

3. The process of receiving encrypted communications in a network as set forth in claim 2, wherein, after a determined period of time elapses following negotiation of the new key, the transmitting device updates the current key with the new key and then uses the updated current key to encrypt a payload, encapsulates the payload in a packet and transmits the packet to the receiving device.

4. The process of receiving encrypted communications in a network as set forth in claim 1, wherein the packet is a packet from a sequence of packets transmitted by the transmitting device to the receiving device, and wherein the transmitting device swaps out the current key with the new key after a delay in a hardware encryption engine of the transmitting device.

5. A device capable of receiving encrypted communications in a network, comprising:

a link layer configured to receive keys for use in decrypting encrypted packets of data received from a transmitting device in a communication session;

a physical (PHY) layer configured to receive an encrypted packet of data from the transmitting device; and a decryption engine coupled with the PHY layer and configured to:

process the received encrypted packet of data with a current key installed in the decryption engine in order to decrypt it, in response to determining that data contained in said received encrypted packet of data cannot be decrypted using the current key, updating said current key with a new key received by said link layer, and after updating said current key with said new key, waiting for a retransmission of the encrypted packet of data, processing the retransmitted packet of data using the updated current key, and only after successfully decrypting the retransmitted packet of data using the updated current key, sending an acknowledgment receipt of the packet to said transmitting device.

6. The device as set forth in claim 5, further comprising a MAC layer driver configured to provide each negotiated key to the decryption engine.

7. The device as set forth in claim 5, wherein the device is configured to allow a payload of the MAC layer to be discarded after decryption but before authentication of the decrypted MAC layer payload.

8. A non-transitory computer readable storage medium having stored thereon a computer readable description of an integrated circuit that, when processed in an integrated circuit manufacturing system, causes the integrated circuit manufacturing system to manufacture a device capable of receiving encrypted communications in a network, comprising:

a link layer configured to receive keys for use in decrypting encrypted packets of data received from a transmitting device in a communication session;

a physical (PHY) layer configured to receive an encrypted packet of data from the transmitting device; and a decryption engine coupled with the PHY layer and configured to:

process the received encrypted packet of data with a current key installed in the decryption engine in order to decrypt it, in response to determining that data contained in said received encrypted packet of data cannot be decrypted using the current key, updating said current key with a new key received by said link layer, and after updating said current key with said new key, waiting for a retransmission of the encrypted packet of data, processing the retransmitted packet of data using the updated current key, and only after successfully decrypting the retransmitted packet of data using the updated current key, sending an acknowledgment receipt of the packet to said transmitting device.

* * * * *